US012498596B2

(12) United States Patent
Nagase et al.

(10) Patent No.: US 12,498,596 B2
(45) Date of Patent: Dec. 16, 2025

(54) OPTICAL MODULATOR

(71) Applicant: TDK CORPORATION, Tokyo (JP)

(72) Inventors: Kenji Nagase, Hong Kong (CN); Hiroshi Take, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 210 days.

(21) Appl. No.: 18/028,857

(22) PCT Filed: Sep. 29, 2021

(86) PCT No.: PCT/JP2021/035754
§ 371 (c)(1),
(2) Date: Mar. 28, 2023

(87) PCT Pub. No.: WO2022/071356
PCT Pub. Date: Apr. 7, 2022

(65) Prior Publication Data
US 2023/0333417 A1 Oct. 19, 2023

(30) Foreign Application Priority Data
Sep. 29, 2020 (CN) .......................... 202011049924.2

(51) Int. Cl.
*G02F 1/035* (2006.01)
*G02B 6/12* (2006.01)
(Continued)

(52) U.S. Cl.
CPC .............. *G02F 1/035* (2013.01); *G02F 1/212* (2021.01); *G02F 1/225* (2013.01);
(Continued)

(58) Field of Classification Search
CPC .......... G02F 1/035; G02F 1/212; G02F 1/225; G02F 1/0316; G02F 2202/20;
(Continued)

(56) References Cited

U.S. PATENT DOCUMENTS 8,582,927 B1 * 11/2013 Thaniyavarn ......... G02F 1/0356
385/2
9,746,743 B1 * 8/2017 Rabiei ................ G02B 6/12009
(Continued)

FOREIGN PATENT DOCUMENTS

JP    2012118384 A  *  6/2012
WO   2019/069815 A1    4/2019

OTHER PUBLICATIONS

Jan. 11, 2022, Search Report issued in International Patent Application No. PCT/JP2021/035754.
Jan. 11, 2022, Written Opinion of the International Searchng Authority issued in International Patent Application No. PCT/JP2021/035754.

*Primary Examiner* — Thomas A Hollweg
*Assistant Examiner* — Erin D Chiem
(74) *Attorney, Agent, or Firm* — Oliff PLC

(57) ABSTRACT

An optical modulator, including: a substrate; a plurality of electro-optic material layers formed on the substrate; and an electrode formed on the electro-optic material layer; wherein the electro-optic material layer has a patterned RF portion waveguide that applies a modulated signal and a patterned DC portion waveguide that applies a direct current bias signal; and on a section perpendicular to a light propagation direction, the sectional area of the DC portion waveguide is greater than the sectional area of the RF portion waveguide.

5 Claims, 5 Drawing Sheets

(51) Int. Cl.
*G02B 6/132* (2006.01)
*G02F 1/03* (2006.01)
*G02F 1/21* (2006.01)
*G02F 1/225* (2006.01)

(52) U.S. Cl.
CPC ............... *G02B 2006/1204* (2013.01); *G02B 2006/12045* (2013.01); *G02B 2006/12142* (2013.01); *G02B 6/132* (2013.01); *G02F 2202/20* (2013.01)

(58) Field of Classification Search
CPC ............ G02B 6/132; G02B 2006/1204; G02B 2006/12045; G02B 2006/12142
See application file for complete search history.

(56) References Cited

U.S. PATENT DOCUMENTS

| | | | |
|---|---|---|---|
| 9,946,100 B2* | 4/2018 | Yanagawa | G02F 1/0316 |
| 2002/0106141 A1* | 8/2002 | Gopalakrishnan | G02F 1/0356 385/2 |
| 2006/0159384 A1* | 7/2006 | Sugiyama | G02F 1/0356 385/14 |
| 2008/0031564 A1* | 2/2008 | Sugiyama | G02F 1/0356 385/9 |
| 2020/0310170 A1 | 10/2020 | Iwatsuka et al. | |

* cited by examiner

OPTICAL MODULATOR

TECHNICAL FIELD

The present invention relates to an optical modulator used in the field of optical communication and optical measurement.

BACKGROUND ART

With the widespread use of the Internet, communication traffic is remarkably increased, and optical fiber communication is becoming significantly important. The optical fiber communication is a communication mode that converts an electrical signal into an optical signal and transmits the optical signal via an optical fiber, and has the characteristics of wide bandwidth, low loss, and strong noise resistance.

Due to such the advantages, the optical fiber communication is applied to various products. A direct modulation mode using a semiconductor laser and an external modulation mode using an optical modulator are known as modes for an optical modulation device to convert an electrical signal into an optical signal. The direct modulation system does not require an optical modulator and is low in cost, but has a limitation in terms of high-speed modulation; therefore, the external optical modulation mode is used for high-speed and long-distance applications.

As an optical modulator, a Mach-Zehnder optical modulator in which an optical waveguide is formed by means of titanium (Ti) diffusion in the vicinity of the surface of a lithium niobate single-crystal substrate is put into practical use. High-speed optical modulators having a modulation speed of more than 40 Gb/s are commercially available. The Mach-Zehnder optical modulator is an optical modulator that uses an optical waveguide (Mach-Zehnder optical waveguide) having a Mach-Zehnder interferometer structure. The Mach-Zehnder interferometer is a device that splits a light emitted from a light source into two beams, makes the two beams pass through different paths, and then recombines the two beams to cause interference. The Mach-Zehnder optical modulator that uses the Mach-Zehnder interferometer is used to generate various modulated lights.

When a voltage is applied to a pair of electrodes, a sufficient electric field can be applied to the optical waveguide, and a half-wave voltage $V_\pi$ can be reduced. The half-wave voltage $V_\pi$ is a difference V1-V2 between a voltage V1 that maximizes light output and a voltage V2 that minimizes the light output, and a drive voltage is proportional to the half-wave voltage $V_\pi$. Therefore, a reduction in the half-wave voltage $V_\pi$ leads to a reduction in the drive voltage.

However, when a DC bias is applied to such an optical waveguide, since the DC drift is large, there is a problem that the life time of the optical modulation element is short. DC drift is the change of the light output operating point with time. Patent Document 1 discloses a technique that can prevent the movement of movable ions by removing at least a part of the waveguide to which the DC voltage is applied, and achieve a DC drift suppression effect.

However, in the case when a direct current bias is applied to such the optical waveguide, due to a large direct current drift, there is a problem of a short life of an optical modulation element. The direct current drift is a change of a light output operating point over time. Patent Document 1 discloses a technique that can prevent the movement of movable ions by removing at least a part of the waveguide to which the direct current voltage is applied, thereby achieving the effect of suppressing the direct current drift.

CITATION LIST

Patent Literature

PRIOR ART DOCUMENT

Patent Document

Patent Document 1: No. WO2019/069815

SUMMARY OF INVENTION

However, the waveguide shape in the optical modulator of Patent Document 1 is not sufficiently effective in suppressing the direct current drift, and there is therefore a desire for a waveguide shape capable of suppressing the direct current drift more effectively.

The present invention is completed in view of the above problem, and an object thereof is to provide an optical modulator, including: a substrate; a plurality of electro-optic material layers formed on the substrate; and an electrode formed on the electro-optic material layer; wherein the electro-optic material layer has a patterned RF portion waveguide that applies a modulated signal and a patterned DC portion waveguide that applies a direct current bias signal; and on a section perpendicular to a light propagation direction, the sectional area of the DC portion waveguide is greater than the sectional area of the RF portion waveguide.

Further, in the optical modulator of the present invention, preferably, the DC portion waveguide includes: a first layered portion formed on the substrate, a first intermediate protrusion portion formed by protruding from the first layered portion, and a first uppermost protrusion portion formed by protruding from the first intermediate protrusion portion; the RF portion waveguide comprises: a second layered portion formed on the substrate, a second intermediate protrusion portion formed by protruding from the second layered portion, and a second uppermost protrusion portion formed by protruding from the second intermediate protrusion portion; and the height of the uppermost end of the first intermediate protrusion portion is higher than the height of the uppermost end of the second intermediate protrusion portion.

Further, in the optical modulator of the present invention, preferably, in the DC portion waveguide, when viewed from the section, the first uppermost protrusion portion is deviated from the center of the first intermediate protrusion portion.

Further, in the optical modulator of the present invention, preferably, a plurality of DC portion waveguides are formed on the substrate as waveguides, and when each is viewed from the section, the first uppermost protrusion portion is positioned on a side of close to adjacent DC portion waveguide.

Further, in the optical modulator of the present invention, preferably, a plurality of DC portion waveguides are formed on the substrate as waveguides; a third layered portion formed on the substrate is formed between adjacent DC portion waveguides; and the height of the third layered portion located between the adjacent DC portion waveguides is higher than the height of the first layered portion located on opposite sides of the adjacent DC portion waveguides.

Further, in the optical modulator of the present invention, preferably, the plurality of waveguides are one or more pairs of Mach-Zehnder waveguides.

The effects of the present invention:

The optical modulator provided by the present invention can effectively suppress the direct current drift of the optical modulator.

BRIEF DESCRIPTION OF DRAWINGS

FIGS. 1(a) and 1(b) are top views of an optical modulator 100 according to an embodiment of the present invention, wherein FIG. 1(a) illustrates only an optical waveguide, and FIG. 1(b) illustrates an entire optical modulator 100 including a traveling wave electrode.

DESCRIPTION OF EMBODIMENTS

The embodiments for implementing the present invention are described below with reference to the drawings.

Figure 1A:
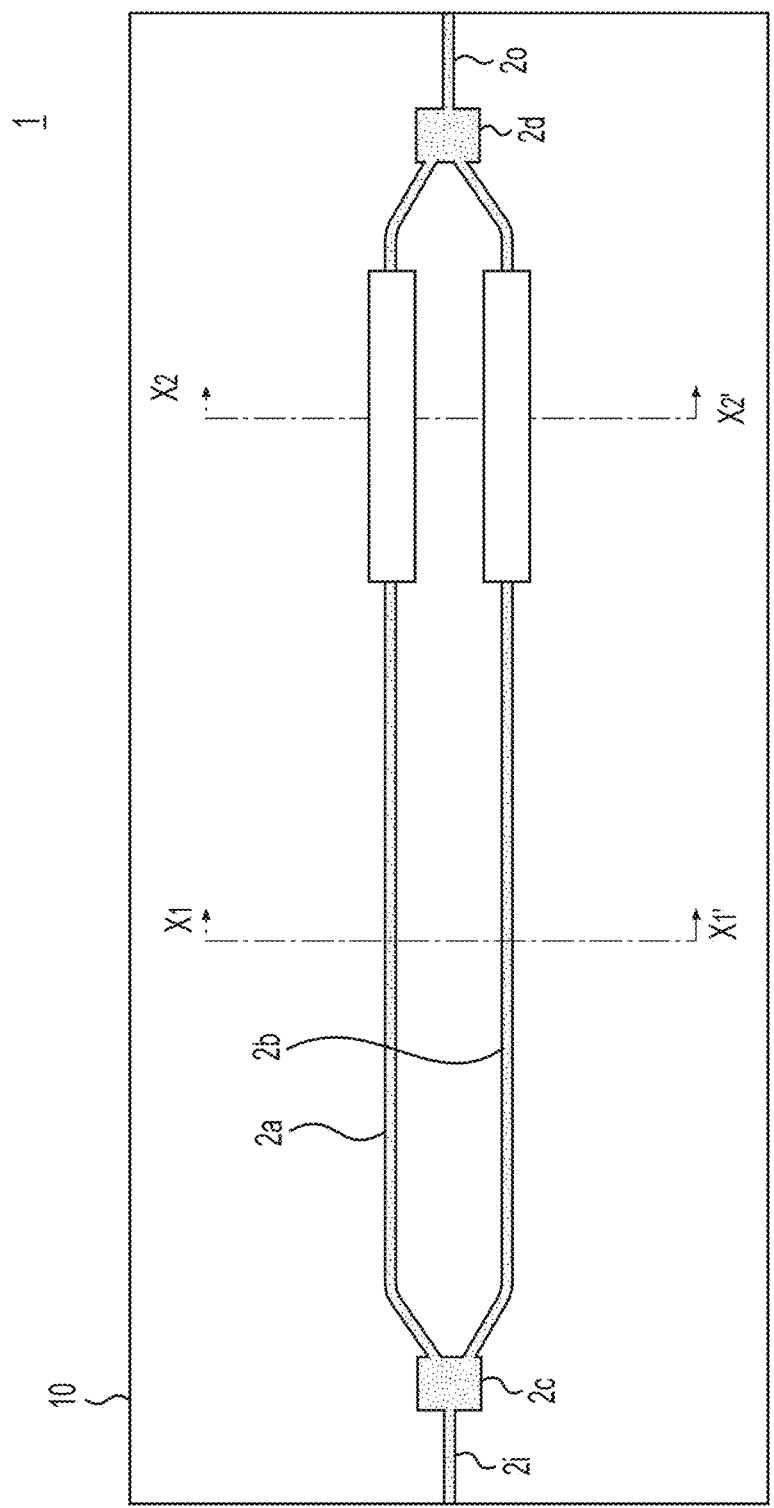
Figure 1B:
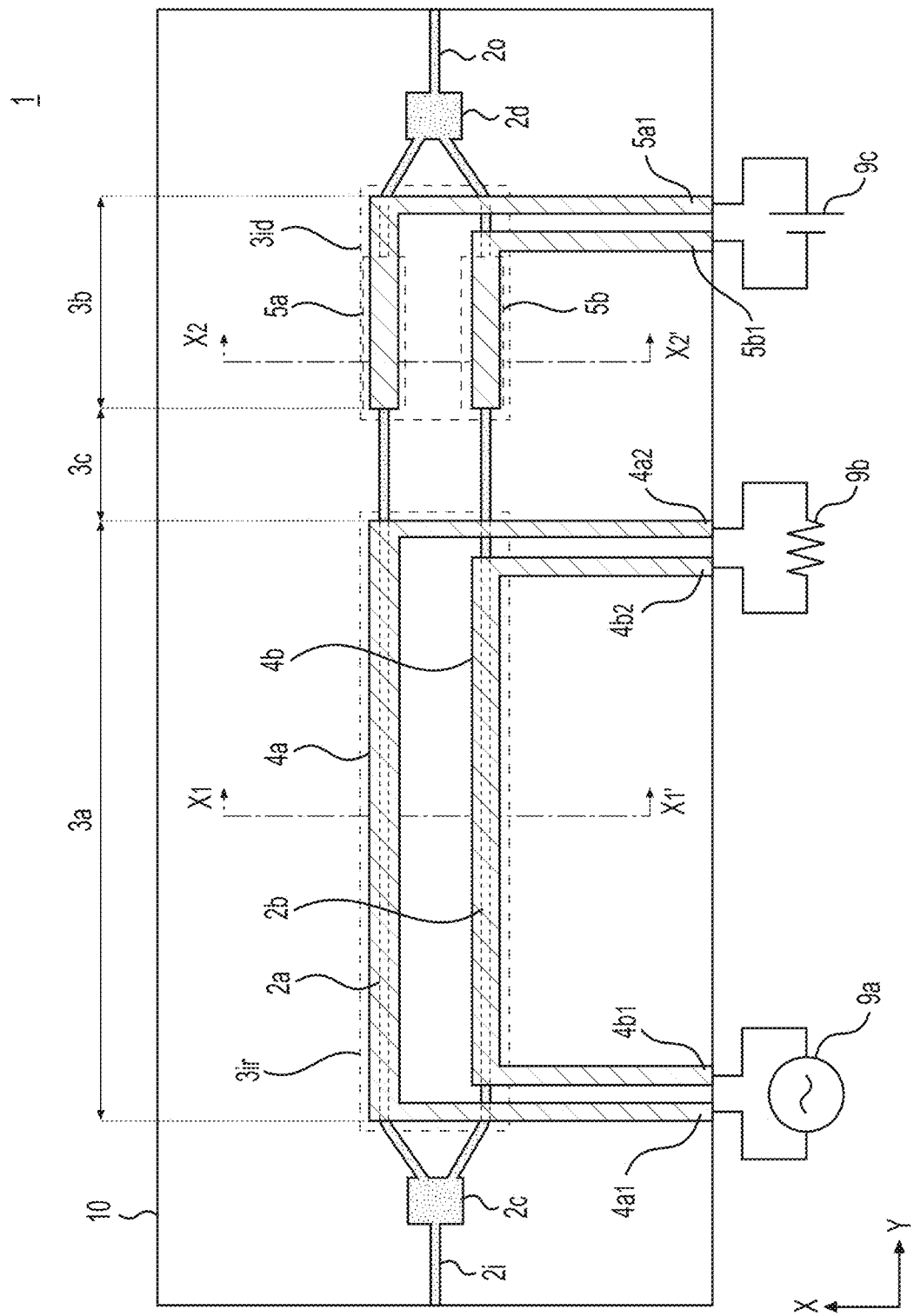

FIGS. 1(a) and 1(b) are top views of an optical modulator 100 (electro-optic device) according to an embodiment of the present invention, wherein FIG. 1(a) illustrates only an optical waveguide, and FIG. 1(b) illustrates an entire optical modulator 100 including a traveling wave electrode.

Referring to FIGS. 1(a) and 1(b), the optical modulator 100 includes a Mach-Zehnder optical waveguide 2 having first and second optical waveguides 2a and 2b formed on a substrate 10 and provided parallel with each other, a first signal electrode 4a provided along the first optical waveguide 2a, a second signal electrode 4b provided along the second optical waveguide 2b, a first bias electrode 5a provided along the first optical waveguide 2a, and a second bias electrode 5b provided along the second optical waveguide 2b. The first signal electrode 4a and the second signal electrode 4b, together with the first optical waveguide 2a and the second optical waveguide 2b, constitute an RF interaction portion 3ir of the Mach-Zehnder optical modulator. The first bias electrode 5a and the second bias electrode 5b, together with the first optical waveguide 2a and the second optical waveguide 2b, constitute a DC interaction portion 3id of the Mach-Zehnder optical modulator.

The Mach-Zehnder optical waveguide 2 is an optical waveguide having the structure of a Mach-Zehnder interferometer. The first and second optical waveguides 2a and 2b are branches from an input optical waveguide 2i at a branch portion 2c, and the first and second optical waveguides 2a and 2b are combined into an output optical waveguide 2o via a multiplexing portion 2d. An input light Si is branched at the branch portion 2c, and the branched lights travel through the first and second optical waveguides 2a and 2b respectively and then are multiplexed at the multiplexing portion 2d, to form modulated light So output from the output optical waveguide 2.

The first and second signal electrodes 4a and 4b are linear electrode patterns overlapping the first and second waveguides 2a and 2b in the plan view, and both ends thereof extend to electrode pad provided in the vicinity of the end surface of the substrate 10. That is, ends 4a1 and 4b1 of the first signal electrode 4a and the second signal electrode 4b are drawn to the electrode pad provided in the vicinity of the end surface of the substrate 10 to form a signal input port, and a drive circuit 9a is connected to the signal input port. In addition, the other ends 4a2 and 4b2 of the first signal electrode 4a and the second signal electrode 4b are drawn to the electrode pad provided in the vicinity of the end surface of the substrate 10 and are connected to each other via a terminating resistor 9. Thus, the first and second signal electrodes 4a and 4b function as differential coplanar traveling wave electrodes.

The first and second bias electrodes 5a and 5b are independent of the first and second signal electrodes 4a and 4b so as to apply a DC voltage (DC bias) to the first and second waveguides 2a and 2b. Ends 5a1 and 5b1 of the first bias electrode 5a and the second bias electrode 5b are drawn to the electrode pad provided in the vicinity of the end surface of the substrate 10 to form a DC bias input port, and a bias circuit 9c is connected to the DC bias input port. In this embodiment, formation region of the first bias electrode 5a and the second bias electrode 5b are provided closer to an output end side of the Mach-Zehnder optical waveguide 2 than formation region of the first signal electrode 4a and the second signal electrode 4b, and however, can also be provided on an input end side.

As described above, the first and second signal electrodes 4a and 4b constitute an RF portion 3a that applies an RF signal to the first and second waveguides 2a and 2b, and the first and second bias electrodes 5a and 5b constitute a DC bias portion that applies a DC bias voltage to the first waveguide 2a and the second waveguide 2b. No signal electrode or bias electrode is provided in an intermediate portion 3c between the RF portion 3a and the DC portion 3b.

Differential signals (modulated signals) having the same absolute value but different polarities are input to one end of each of the first and second signal electrodes 4a and 4b. Since the first waveguide 2a and the second waveguide 2b are made of a material having an electro-optic effect, such as lithium niobate, refractive indices of the first waveguide 2a and the second waveguide 2b respectively change with $+\Delta n$ and $\&\ \#8211; \Delta n$ according to an electric field applied to the first waveguide 2a and the second waveguide 2b, and a phase difference between the pair of optical waveguides changes. A signal light modulated by the change in the phase difference is output from the output optical waveguide 2o.

Figure 2:
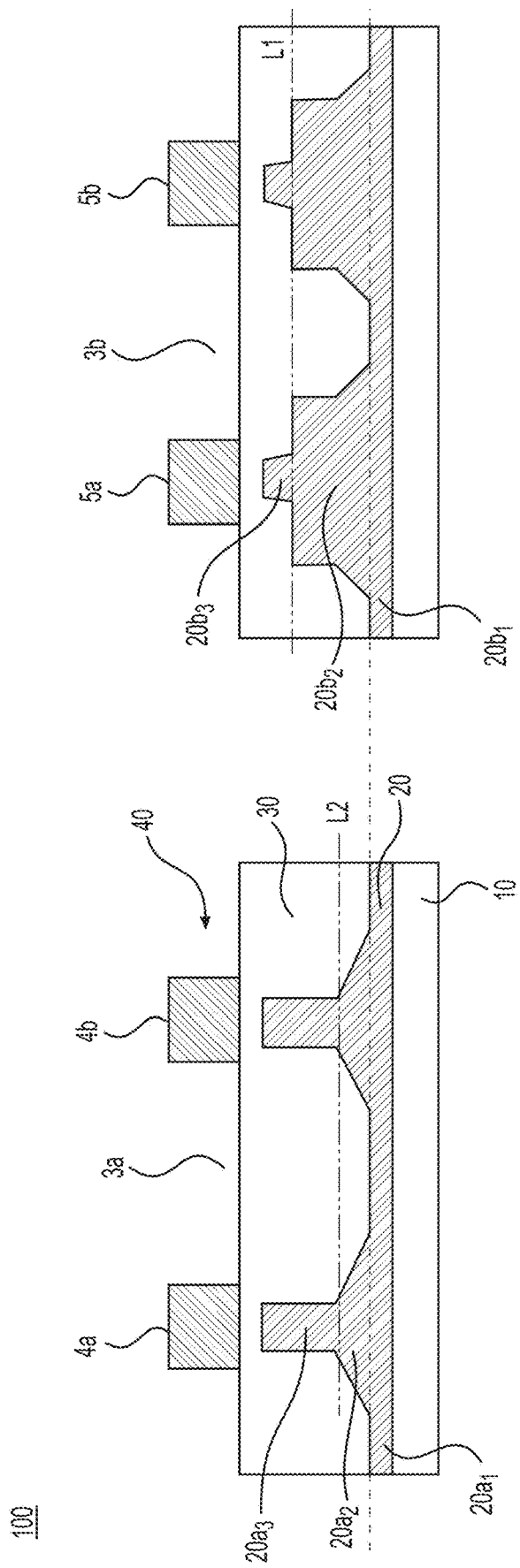
FIG. 2 is a schematic cross-sectional view of the optical modulator 100 along line X1-X1' and line X2-X2' in FIGS. 1(a) and 1(b).

FIG. 2 is a schematic cross-sectional view of the optical modulator 100 along line X1-X1' and line X2-X2' in FIGS. 1(a) and 1(b).

As illustrated in FIG. 2, the optical modulator 100 according to this embodiment has a multilayer structure in which the substrate 10, a waveguide layer 20, a buffer layer 30, and an electrode layer 40 are laminated in this order. The substrate 10 is, e.g., a sapphire substrate, and the waveguide layer 2 formed of a lithium niobate film is formed on the surface of the substrate 10. In this case, the waveguide layer 20 corresponds to the first and second optical waveguides 2a and 2b in FIG. 1. More specifically, the RF portion 3a of the first optical waveguide 2a in FIG. 1 corresponds to the waveguide layers $20a_{1-3}$ under the electrode portion 4a in FIG. 2, and the RF portion 3a of the second optical waveguide 2b in FIG. 1 corresponds to the waveguide layers $20a_{1-3}$ under the electrode portion 4b in FIG. 2. The DC portion 3b of the first optical waveguide 2a in FIG. 1 corresponds to the waveguide layers $20b_{1-3}$ under the electrode portion 5a in FIG. 2, and the DC portion 3b of the second optical waveguide 2b in FIG. 1 corresponds to the waveguide layers $20b_{1-3}$ under the electrode portion 5b in FIG. 2. In order to prevent the light propagating in the first and second optical waveguides 2a and 2b from being absorbed by the electrode portions 4a, 4b, 5a, and 5b, the buffer layer 30 is formed at least between the first and second optical waveguides 2a and 2b and the electrode portion 4a, 4b, 5a, and 5b. Therefore, the buffer layer 30 only needs to function as an intermediate layer between the optical waveguide and the signal electrode, and the material of the buffer layer can be widely selected from non-metal. For example, the buffer layer may be a ceramic layer made of insulating materials such as metal oxides, metal nitrides, and metal carbides. The material of the buffer layer may be a crystalline material or an amorphous material. Ins a more preferred embodiment, regarding the buffer layer 30, a material having a refractive index less than that of the waveguide layer 20 can be used, e.g., $Al_2O_3$, $SiO_2$, $LaAlO_3$, $LaYO_3$, ZnO, $HfO_2$, MgO, $Y_2O_3$, and the like.

The first and second signal electrodes 4a and 4b, and the first and second bias electrodes 5a and 5b are provided in the electrode layer 40. In the RF portion 3a, the first and second signal electrodes 4a and 4b are opposite to the first and second optical waveguides 2a and 2b via the buffer layer 30, so as to modulate the light traveling in the first and second optical waveguides 2a and 2b. In the DC portion 3b, the first and second bias electrodes 5a and 5b are opposite to the first and second optical waveguides 2a and 2b via the buffer layer 30, so as to provide a DC bias voltage to the light traveling in the first and second optical waveguides 2a and 2b.

Although the waveguide layer 20 is not particularly limited in type as long as it is formed of an electro-optic material, it is preferably formed of lithium niobate ($LiNbO_3$). This is because lithium niobate has a large electro-optic constant and is thus suitable as the constituent material of an electro-optic device such as an optical modulator. Hereinafter, the configuration of the present invention in the case when the waveguide layer 20 is formed of a lithium niobate film will be described in detail.

Although the substrate 10 is not particularly limited in type as long as it has a lower refractive index than the lithium niobate film, it is preferably a substrate on which the lithium niobate film can be formed as an epitaxial film, preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having various crystal orientations. Since the c-axis oriented lithium niobate film has three-fold symmetry, the underlying single-crystal substrate preferably has the same symmetry. Thus, the single-crystal sapphire substrate preferably has a c-surface, and the single-crystal silicon substrate preferably has a (111) surface.

The term "epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, the existence of an epitaxial film can be confirmed by first measuring the peak intensity at the orientation position by 2θ-θX-ray diffraction and then confirming poles.

Specifically, first, in the 2θ-θX-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are sym-metrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNbA_yO_z$. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

It is desirable to form the lithium niobate film by a film forming method such as sputtering, CVD, or sol-gel process. If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth. As a formation method for the lithium niobate film, there is known a method of thinly polishing or slicing the lithium niobate single crystal substrate. This method is ad-vantageous in that the same characteristics as the single crystal can be obtained and can be applied to the present invention.

In this embodiment, referring to FIG. 2, on a section perpendicular to a light propagation direction, the sectional area of the waveguide layer 20 of the DC portion 3b is greater than the sectional area of the waveguide layer 20 of the RF portion 3a. By configuring the sectional area of the waveguide layer 20 of the DC portion 3b to be larger, the direct current drift can be reduced.

The principle of reducing the direct current drift by increasing the sectional area of the waveguide layer 20 of the DC portion 3b is not explicit, but it can be presumed as follows: since the impedance of the waveguide layer 20 from the bias electrodes 5a and 5b of the DC portion 3b to a ground electrode (not illustrated) increases, a change in the impedance is small even after a long working time, thus the direct current drift caused by the impedance change inside the waveguide layer 20 is correspondingly reduced.

In addition, referring to FIG. 2, the waveguide layer 20 of the DC portion 3$b$ includes: a first layered portion 20$b_1$ formed on the substrate 10, a first intermediate protrusion portion 20$b_2$ formed by protruding from the first layered portion 20$b_1$, and a first uppermost protrusion portion 20$b_3$ formed by protruding from the first intermediate protrusion portion 20$b_2$. Herein, the first layered portion 20$b_1$ is thinly formed on the substrate 10, may be formed in a flat shape, for example, but is not limited thereto, or may be a slightly inclined layer. The first intermediate protrusion portion 20$b_2$ protrudes from the first layered portion 20$b_1$, for example, the first intermediate protrusion portion 20$b_2$ may protrude upward from the first layered portion 20$b_1$ in a trapezoid shape and then protrude upward in a rectangle shape. However, the shape of the first intermediate protrusion portion 20$b_2$ is not limited thereto, and it may protrude only in a trapezoid or rectangle shape, or may protrude in multiple stages. The first uppermost protrusion portion 20$b_3$ is the uppermost protrusion portion, and may protrude in a trapezoid shape or a rectangle shape, for example. The trapezoid or rectangle protrusion is described herein, but the trapezoid or rectangle shape is not limited to a conical or cylindrical shape. The protrusion may have a shape with a horizontal section which is constantly a trapezoid, a triangle, or a rectangle. The protrusion may also have a shape such as a frustum. The same is applies to the following description.

The waveguide layer 20 of the RF portion 3$a$ includes: a second layered portion 20$a_1$ formed on the substrate 10, a second intermediate protrusion portion 20$a_2$ formed by protruding from the second layered portion 20$a_1$, and a second uppermost protrusion portion 20$a_3$ formed by protruding from the second intermediate protrusion portion 20$a_2$. Herein, the second layered portion 20$a_1$ is thinly formed on the substrate 10, may be formed in a flat shape, for example, but is not limited thereto, or may be a slightly inclined layer. The second intermediate protrusion portion 20$a_2$ protrudes from the second layered portion 20$a_1$, for example, the second intermediate protrusion portion 20$a_2$ may protrude upward from the second layered portion 20$a_1$ in a trapezoid shape, an inclination angle of the second intermediate protrusion portion 20$a_2$ may be less than an inclination angle of the first intermediate protrusion portion 20$b_2$. That is, the second intermediate protrusion portion 20$a_2$ protrudes upward in a manner gentler (flatter) than that of the first intermediate protrusion portion 20$b_2$. However, the shape of the second intermediate protrusion portion 20$a_2$ is not limited thereto, and an inclined side thereof may be formed in a curved shape. The second uppermost protrusion portion 20$a_3$ is the uppermost protrusion portion, and may protrude in a trapezoid shape or a rectangle shape, for example.

Referring to FIG. 2, the height L1 of the uppermost end of the first intermediate protrusion portion 20$b_2$ of the DC portion 3$b$ is higher than the height L2 of the uppermost end of the second intermediate protrusion portion 20$a_2$ of the RF portion 3$a$. That is, the lowermost end of the first uppermost protrusion portion 20$b_3$ is located above the lowermost end of the second uppermost protrusion portion 20$a_3$. As a result, the sectional area of the first intermediate protrusion portion 20$b_2$ can be greater than the sectional area of the second intermediate protrusion portion 20$a_2$, thereby increasing the sectional area of the waveguide layer 20 of the DC portion 3$b$ and reducing the direct current drift.

Figure 3:
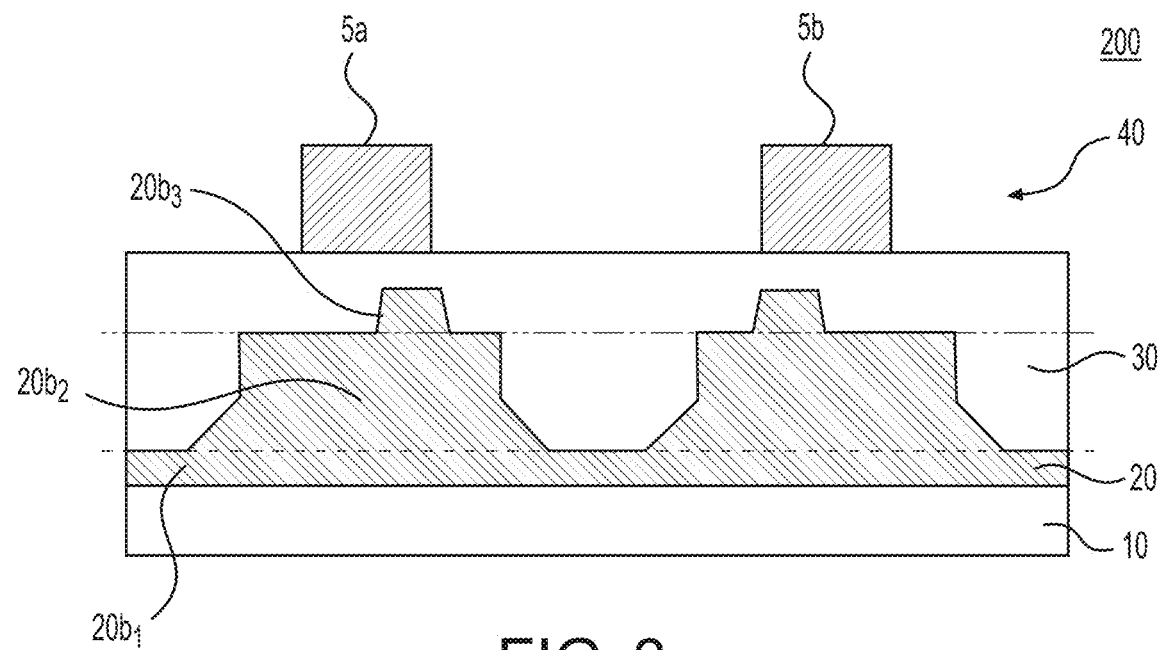
FIG. 3 is a schematic cross-sectional view of a waveguide of an optical modulator 200 according to another embodiment of the present invention.

FIG. 3 is a schematic cross-sectional view of a waveguide of an optical modulator 200 according to another embodiment of the present invention. The sectional shape of the RF portion 3$a$ of the optical modulator 200 is exactly the same as the sectional shape of the RF portion 3$a$ of the optical modulator 100, and the illustration is omitted herein.

Referring to FIG. 3, in the waveguide layer 20 of the DC portion 3$b$ of the optical modulator 200, the first uppermost protrusion portion 20$b_3$ is deviated from the center of the first intermediate protrusion portion 20$a_3$ on a section perpendicular to a light propagation direction. In the example of FIG. 3, the pair of first uppermost protrusion portions 20$b_3$ under the pair of bias electrodes 5$a$ and 5$b$ of the DC portion 3$b$ are both configured to be deviated from the center; alternatively, either one of the pair of first uppermost protrusion portions 20$b_3$ under the pair of bias electrodes 5$a$ and 5$b$ of the DC portion 3$b$ may be configured to be deviated from the center. In addition, the two first uppermost protrusion portions 20$b_3$ may both be close to the inner-side or outer-side of the pair of bias electrodes 5$a$ and 5$b$ of the DC portion 3$b$, for example.

In addition, from the viewpoint of increasing the impedance of the waveguide layer 20 from the bias electrodes 5$a$ and 5$b$ to the ground electrode (not illustrated, for example, located outer-side the bias electrodes 5$a$ and 5$b$), it is preferable that the first uppermost protrusion portion 20$b_3$ is positioned on a side close to adjacent DC portion waveguide, i.e., the two first uppermost protrusions portions 20$b_3$ are both offset to the inner-side of the pair of bias electrodes 5$a$ and 5$b$ of the DC portion 3$b$.

In the optical modulator 200 according to another embodiment of the present invention, the impedance of the waveguide layer 20 from the pair of bias electrodes 5$a$ and 5$b$ of the DC portion 3$b$ to the ground electrode (not illustrated) increases, thereby suppressing the change in the impedance of this part of waveguide layer 20 and reducing the direct current drift.

Figure 4:
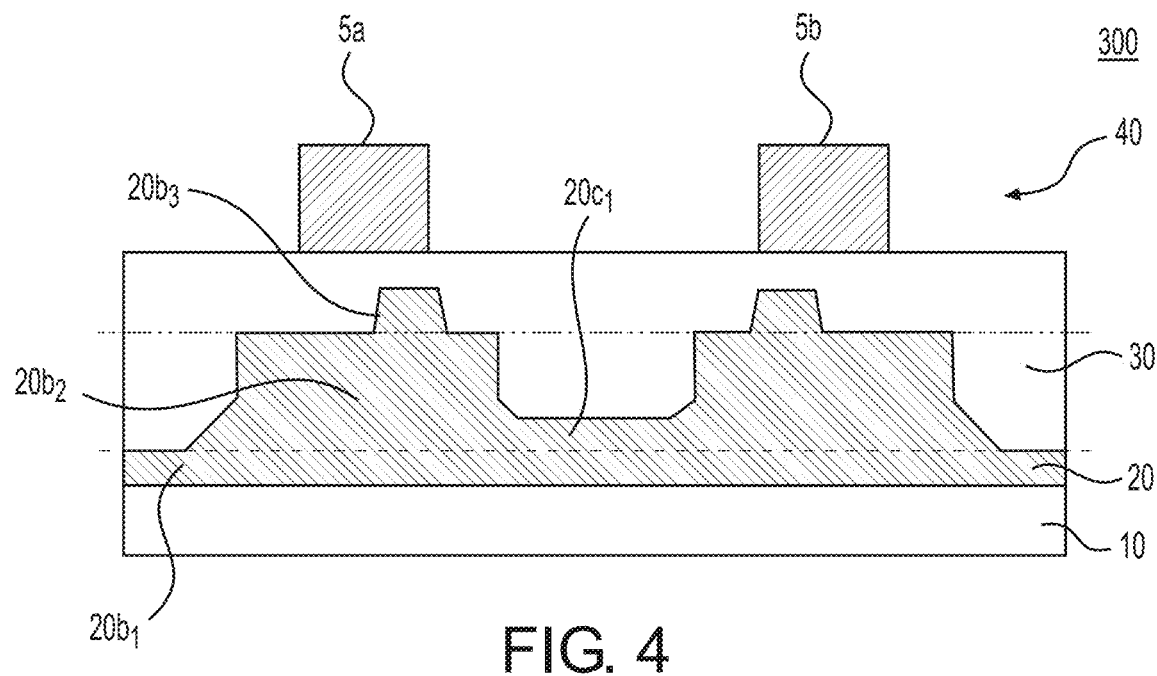
FIG. 4 is a schematic cross-sectional view of a waveguide of an optical modulator 300 according to another embodiment of the present invention.

FIG. 4 is a schematic cross-sectional view of a waveguide of an optical modulator 300 according to another embodiment of the present invention. The sectional shape of the RF portion 3$a$ of the optical modulator 300 is exactly the same as the sectional shape of the RF portion 3$a$ of each of the optical modulators 100 and 200, and the illustration is omitted herein.

As shown in FIG. 4, the difference between the optical modulator 300 and the optical modulator 200 lies in that: a third layered portion 20$c_1$ formed on the substrate 10 is formed between the waveguides of adjacent DC portions 3$b$, wherein the height of the third layered portion 20$c_1$ located between the waveguides of the adjacent DC portions 3$b$ is higher than the height of the first layered portions 20$b_1$ located on the opposite sides of the waveguides of the adjacent DC portions 3$b$.

Specifically, the third layered portion 20$c_1$ is formed between the pair of first intermediate protrusion portions 20$b_2$ of the DC portion 3$b$, and the height of the third layered portion 20$c_1$ is higher than that of the first layered portions 20$b_1$ located on both sides of the pair of first intermediate protrusion portions 20$b_2$. When a bias voltage is applied to the pair of bias electrodes 5$a$ and 5$b$ in a differential manner, since the thickness of the electro-optic material layer between the waveguide layers 20 under the pair of bias electrodes 5$a$ and 5$b$ is increased, the impedance at this position is increased, thus even after a long working time, the impedance at this position has a small change compared with the initial one, thereby reducing the direct current drift.

Examples

In the comparative examples and examples, an acceleration test for the direct current drift of the optical modulator is performed. In the acceleration test, a direct current bias is continuously applied at a high temperature of 100° C., and the duration is recorded when a direct current offset reaches 50%.

Figure 5:
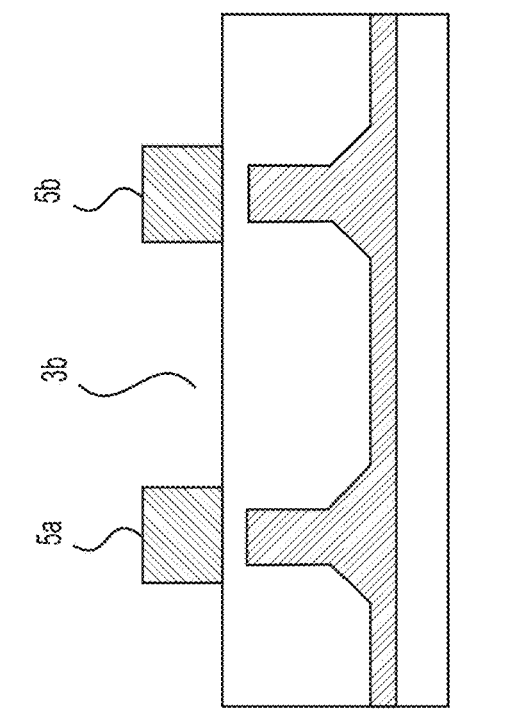
FIG. 5 is a schematic cross-sectional view of a waveguide of an optical modulator 400 according to a comparative example.
Figure 5:
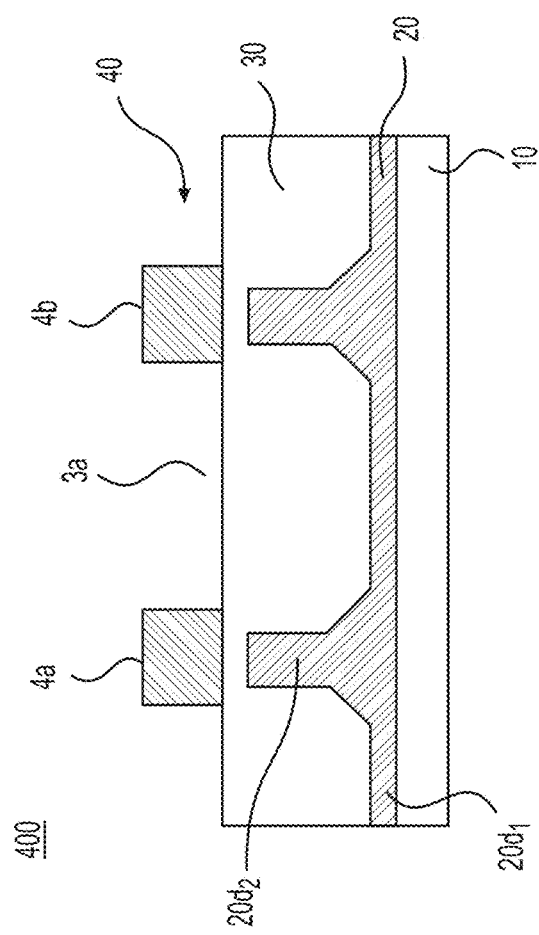

FIG. 5 is a schematic sectional view of a waveguide of an optical modulator 400 according to a comparative example. The sectional shape of the waveguide layer 20 of the optical modulator 400 has a shape in which a protrusion portion $20d_2$ is formed on the layered portion $20d_1$. The optical modulators of comparative examples A and B are optical modulators having the sectional structure illustrated in FIG. 5.

The optical modulators of examples 1A and 1B are optical modulators having the sectional structure illustrated in FIG. 2. The optical modulators of examples 2A and 2B are optical modulators having the sectional structure illustrated in FIG. 3. The optical modulators of examples 3A and 3B are optical modulators having the sectional structure illustrated in FIG. 4. The materials used in components of each example and comparative example are the same.

Table 1 illustrates evaluation results of the direct current drift of each example and comparative example.

TABLE 1

| Sample | Direct current drift by 50% |
| --- | --- |
| Comparative example A | 49.8 |
| Comparative example B | 44.9 |
| Example 1A | 89 |
| Example 1B | 96 |
| Example 2A | 118 |
| Example 2B | 119 |
| Example 3A | 168 |
| Example 3B | 168 |

It can be seen from Table 1 that in comparative examples A and B, the direct current drift amount reaches 50% (the ratio of the direct current drift amount to the direct current bias) after more than forty hours. However, in examples 1A and 1B in which the sectional area of the waveguide layer of the DC portion is increased, the direct current drift amount reaches 50% after about 90 hours. Moreover, in examples 2A and 2B in which the uppermost protrusion portion is deviated from the center, the direct current drift amount reaches 50% after about 120 hours, further suppressing the direct current drift compared with examples 1A and 1B. Furthermore, in examples 3A and 3B in which the third (intermediate) layered portion is provided between the pair of DC portion waveguides, the direct current drift amount reaches 50% after about 169 hours, further suppressing the direct current drift.

Although the present invention is specifically described above with reference to the drawings and embodiments, it can be understood that the above description does not limit the present invention in any form. For example, in the above description of the optical modulators 100 to 300, the sectional shape of a pair of Mach-Zehnder optical waveguides is taken as an example. However, the present invention is not limited thereto, and there may be one or more optical waveguides having the above-mentioned sectional shape.

Those skilled in the art can make modifications and changes to the present invention as needed without departing from the essential spirit and scope of the present invention, and these modifications and changes fall within the scope of the present invention.

DESCRIPTION OF REFERENCE NUMERAL 100, 200, 300, 400 Optical modulators
10 substrate
20 waveguide layer
30 buffer layer
40 electrode layer
2a first optical waveguide
2b second optical waveguide
2c branch portion
2d multiplexing
2i input optical waveguide
2o output optical waveguide
3a RF portion
3b DC portion
4a first signal electrode
4b second signal electrode
5a first bias electrode
5b second bias electrode
$20b_1$ first layered portion
$20b_2$ first intermediate protrusion portion
$20b_3$ first uppermost protrusion portion
$20a_1$ second layered portion
$20a_2$ second intermediate protrusion portion
$20a_3$ second uppermost protrusion portion
$20c_1$ third layered portion

The invention claimed is:
1. An optical modulator, comprising:
a substrate;
a plurality of electro-optic material layers formed on the substrate; and
an electrode formed on the electro-optic material layer; wherein
the electro-optic material layer has a patterned RF portion waveguide that applies a modulated signal and a patterned DC portion waveguide that applies a direct current bias signal; and
on a section perpendicular to a light propagation direction, a sectional area of the DC portion waveguide is greater than a sectional area of the RF portion waveguide,
wherein
the DC portion waveguide comprises: a first layered portion formed on the substrate, a first intermediate protrusion portion formed by protruding from the first layered portion, and a first uppermost protrusion portion formed by protruding from the first intermediate protrusion portion;
the RF portion waveguide comprises: a second layered portion formed on the substrate, a second intermediate protrusion portion formed by protruding from the second layered portion, and a second uppermost protrusion portion formed by protruding from the second intermediate protrusion portion; and
the height of the uppermost end of the first intermediate protrusion portion is higher than the height of the uppermost end of the second intermediate protrusion portion.

2. The optical modulator according to claim 1, wherein
in the DC portion waveguide, when viewed from the section, the first uppermost protrusion portion is deviated from the center of the first intermediate protrusion portion.

3. The optical modulator according to claim 1, wherein
a plurality of DC portion waveguides are formed on the substrate as waveguides, and when each is viewed from the section, the first uppermost protrusion portion is positioned on a side close to an adjacent DC portion waveguide.

4. The optical modulator according to claim 1, wherein
a plurality of DC portion waveguides are formed on the substrate as waveguides;

a third layered portion formed on the substrate is formed between adjacent DC portion waveguides; and the height of the third layered portion located between the adjacent DC portion waveguides is higher than the height of the first layered portion located on opposite sides of the adjacent DC portion waveguides.

5. The optical modulator according to claim 1, wherein
a plurality of DC portion waveguides are formed on the substrate as waveguides; and the plurality of waveguides are one or more pairs of Mach-Zehnder waveguides.

* * * * *